United States Patent [19]

Murakami et al.

[11] 4,061,477
[45] * Dec. 6, 1977

[54] METHOD AND APPARATUS FOR THE PURIFICATION OF WASTE GAS CONTAINING GASEOUS POLLUTANTS

[75] Inventors: Heiichiro Murakami; Tsuneo Okamoto, both of Iwaki, Japan

[73] Assignee: Taiyo Kaken Company, Ltd., Tokyo, Japan

[*] Notice: The portion of the term of this patent subsequent to Sept. 13, 1994, has been disclaimed.

[21] Appl. No.: 756,650

[22] Filed: Jan. 4, 1977

Related U.S. Application Data

[63] Continuation-in-part of Ser. No. 659,901, Feb. 20, 1976, Pat. No. 4,047,906.

[30] Foreign Application Priority Data

Feb. 27, 1975  Japan .................................. 50-24262

[51] Int. Cl.² ............................................. B01D 53/12
[52] U.S. Cl. ...................................... 55/79; 23/288 S; 55/390; 252/417
[58] Field of Search ................ 23/270 ST, 277 R, 284, 23/288 G, 288 S; 55/34, 60, 68, 79, 390, 479; 210/20, 189; 252/417; 423/449

[56] References Cited

U.S. PATENT DOCUMENTS

| | | | |
|---|---|---|---|
| 2,367,694 | 1/1945 | Snuggs | 55/79 X |
| 2,371,619 | 3/1945 | Hartley | 23/288 S X |
| 2,443,190 | 6/1948 | Krebs | 23/288 S X |
| 2,444,990 | 7/1948 | Hemminger | 23/288 S X |
| 2,664,967 | 1/1954 | Molstedt | 55/79 |
| 2,716,587 | 8/1955 | Hillard, Jr. | 23/288 S X |
| 3,786,134 | 1/1974 | Amagi et al. | 423/449 |
| 3,917,806 | 11/1975 | Amagi et al. | 423/449 |

FOREIGN PATENT DOCUMENTS

566,945  12/1932  Germany .......................... 23/270 ST

*Primary Examiner*—Charles N. Hart
*Assistant Examiner*—Robert H. Spitzer
*Attorney, Agent, or Firm*—Lane, Aitken, Dunner & Ziems

[57] ABSTRACT

A fluidized-bed process and apparatus involving a vertical column containing a plurality of perforated trays, each tray having a weir disposed on its upper surface to divide that surface into first and second sections, each of which has a plurality of apertures. One section of each tray constitutes 80 to 95% of the total tray surface area. Location of the weir on successive trays alternates from side to side of the column to provide for cross-flow of the fluidized material on the trays.

15 Claims, 10 Drawing Figures

METHOD AND APPARATUS FOR THE PURIFICATION OF WASTE GAS CONTAINING GASEOUS POLLUTANTS

CROSS-REFERENCE TO RELATED APPLICATION

The present application is a continuation-in-part of our earlier application, U.S. Ser. No. 659,901, filed Feb. 20, 1976, now U.S. Pat. No. 4,047,906, and entitled "METHOD FOR THE PURIFICATION OF WASTE GAS CONTAINING GASEOUS POLLUTANTS." The teachings of said earlier application are incorporated herein by reference.

FIELD OF THE INVENTION

The present invention relates to a method and apparatus for the purification of a gas containing gaseous pollutants.

BACKGROUND OF THE INVENTION

Various industrial processes generate waste gases containing gaseous pollutants such as organic solvents. From the standpoint of the reuse of resources or the prevention of air pollution, therefore, a waste gas containing such noxious gaseous pollutants must be freed of the noxious pollutants before it is released into the atmosphere.

Various methods for effecting purification of gases containing gaseous pollutants by adsorption have been devised. As occasion requires, these prior methods involve recovery of the removed noxious pollutants. Of these prior methods, one popular method makes use of a fluidized-bed type adsorption system wherein a gas to be treated and adsorbent particles such as activated carbon, activated alumina or silica are brought into mutual contact to form a fluidized bed of the adsorbent particles. In the continuous adsorption of the gas by this fluidzied-bed method, it is common practice to arrange fluidized beds in a plurality of stages within a tower as illustrated in FIG. 1 of the accompanying drawing, for example. In FIG. 1, 1 denotes a reaction tower. A gas containing noxious gaseous pollutants to be removed is introduced into the tower 1 through a nozzle 2 in the adsorption section A. On entering the tower interior, the gas ascends vertically and comes into contact with adsorbent particles held inside the adsorption section A, causing the adsorbent particles to form fluidized beds on the superposed trays 3, 3', 3" . . . The adsorbent particles forming the fluidized beds adsorb the gaseous pollutants from the gas. The gas which has thus been freed of the noxious pollutants is released into the atmosphere via a discharge outlet 4 at the top of the tower. The adsorbent particles on the superposed trays 3, 3', 3" . . . , fall through the downcommers 5, 5', 5". . . associated with the trays and descent gradually downwardly by virtue of gravity, while simultaneously adsorbing the gaseous pollutants from the gas. Then, they leave the adsorption section A and accumulate in a funnel or guide 6, forming a gravitationally moving bed. The particulate carbon eventually reaches regeneration section B which is located at the bottom of the reaction tower 1. On entering the regeneration section B, the adsorbent particles are heated by a heater 7, with the result that the particles are regenerated as they are forced by the heating to release the adsorbed pollutants. Subsequently, the regenerated adsorbent particles reaching the bottom 8 of the tower are transferred via a lifting pipe 9 to the top of the tower for recyclic service. In the meantime, the pollutants which have been desorbed from the adsorbent particles are forced out of the system via a nozzle 10 by means of a carrier gas being introduced via a nozzle 11 disposed at the lower portion of the regeneration section B. The discharged pollutants are transferred to a desorbate treating section C composed of a condenser, decanter and the like.

In the adsorption treatment of the gas by the fluidized-bed method described above, successful stabilization of the fluidized beds thus formed constitutes an essential requirement for enabling the removal of the noxious gaseous pollutants from the gas to be effected continuously at a high removal efficiency over long periods of service. The stability of such fluidized beds depends on the shape of adsorbent particles used, the strength, wear resistance and other physical properties of the particles and the flow volume, flow velocity and viscosity of the gas used for fluidizing the adsorbent particales, and so on. It also depends on the extent of change in the weight of the adsorbent particles being recycled. When the adsorption treatment of gas by the convention fluidized-bed type technique is reviewed from this point of view, it is noted that the so-called coconut-shell activated carbon obtained from coconut husks is popularly used as the adsorbent particles. The activated carbon of this type is made up of particles of various, complicated shapes and therefore makes their transport substantially difficult. Moreover, the adsorbent particles have poor physical properties and, for this reason, are readily pulverized as by crushing and attrition. Recyclic use of such activated carbon particles of irregular shapes, therefore, involves numerous difficulties. In the adsorption treatment of gas by the fluidized-bed method, the adsorbent particles of such shapes induce undesirable phenomena such as boiling, channeling and slugging, when fluidized by the upward flow of the gas under treatment. They also cause similar phenomena while they are moving downwardly via the downcommers (corresponding to the items denoted by 5, 5', 5", . . . in FIG. 1) by gravity, with the result that smooth flow of the particles inside the downcommers is impeded. This impeded flow consequently brings about a quantitative change in the weight of the adsorbent particles being transferred for recyclic service. With a view of precluding these disadvantageous phenomena, the conventional approach has been directed to improvement of the structure of downcommers of the particles. For example, U.S. Pat. No. 2,674,338 discloses bottom plates supported on springs on the bottoms of the downcommers. These attempts at improvement of the structure of the downcommers, however, effectively complicate the system itself and have the disadvantage that activated carbon particles will gradually change in shape with the lapse of time. Thus, all these attempts have failed to attain the desired stabilization of the quantitative transport of adsorbent particles. Because the adsorbent particles in use are highly susceptible to pulverization and also because stabilization of the transport of these absorbent particles is difficult to accomplish, the conventional techniques do not easily fulfill the objective of stabilizing the fluidized beds of the absorbent particles.

SUMMARY OF THE INVENTION

It is, therefore, a primary object of the present invention to provide a novel method for the purification of a waste gas by the fluidized-bed principle, which method, by recyclic use of activated carbon spheres, is capable of continuously and effectively purging the gaseous pollutants from the gas.

This and other objects of the present invention will become apparent from the following description of the invention.

It has now been discovered that the stabilization of the fluidized beds and the stabilization of the quantitative transport of activated carbon particles are both attained easily by using activated carbon spheres as the adsorbent particles and also using perforated plates of a specific construction as the trays within the reaction tower.

According to the present invention, there is provided a method for the continuous purification of a waste gas containing gaseous pollutants. The method includes the steps of providing a tower containing at least two vertically-spaced, perforated trays of a specific design, continuously introducing the waste gas upwardly into the tower from the bottom and at the same time continuously and recircularly feeding activated carbon spheres into the upper portion of the tower thereby continuously contacting the waste gas with the activated carbon spheres, and continuously removing purified gas from the top of the tower. Each of the perforated plates has a weir provided on its surface disposed to divide its surface area into one portion having 80–95% of the total surface area and another portion having 5–20% of the total surface area.

DETAILED DESCRIPTION OF THE INVENTION

Figure 1:
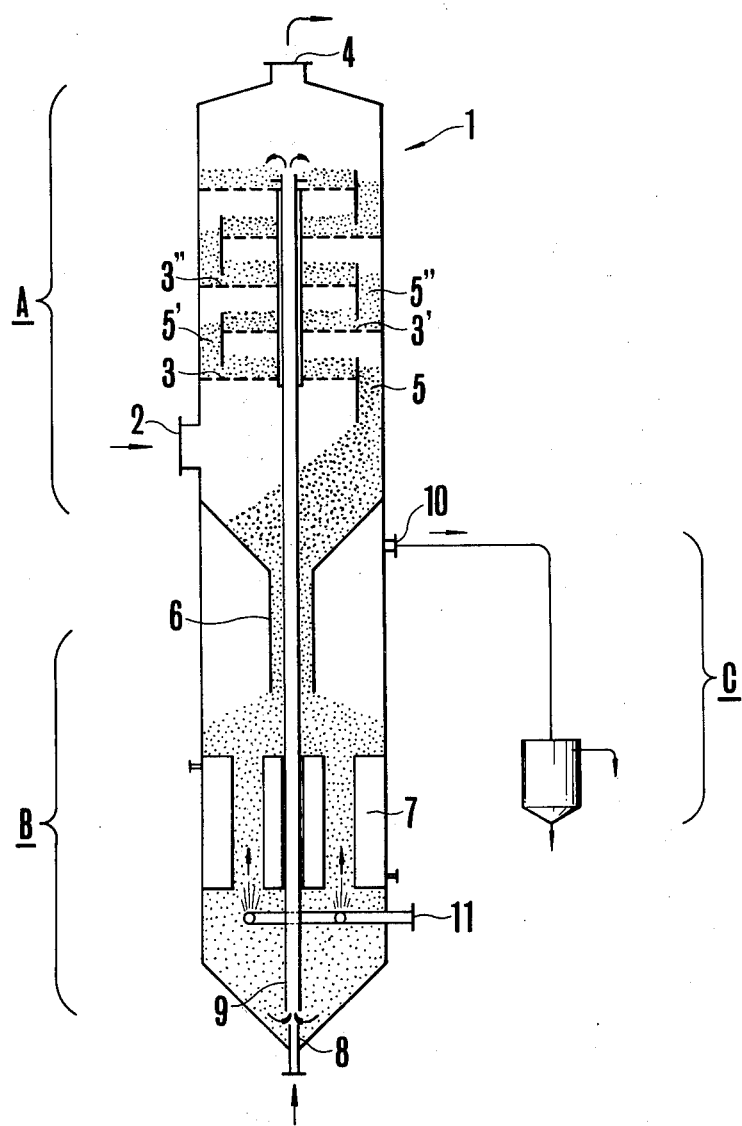
FIG. 1 is a schematic explanatory diagram illustrating one example of a prior art adsorption apparatus for the removal of gaseous pollutants by the fluidized-bed principle.

In the method of the present invention, activated carbon spheres are used as the adsorbent particles. Because of their spherical shape, these activated carbon spheres offer the advantages of excellent fluidity, outstanding resistance to friction and wear and high impact strength. For the purpose of the present invention, the activated carbon spheres may be of the type which are obtained by mixing a powdery carbon or carbon precursor with a binding agent, subsequently molding the resultant mixture in the shape of spheres and activating the molded carbon spheres by an ordinary method (otherwise, referred to generally as "activated carbon spheres from caking coal"). It is however, preferable to use the type of activated carbon spheres produced from a specific type of pitch as the raw material by a specific method such as disclosed in U.S. Pat. No. 3,917,806, because the activated carbon spheres of this type have an excellent spherical shape and physical properties. The superiority of this type of activated carbon sphere over various other types of activated carbon particles is easily confirmed by subjecting samples of the various types of activated carbon to a friction test, then sifting the tested sample particles through a sieve of 200 mesh (by the Tyler standard) and comparing the weights of the corresponding sievings. This test can be preformed by using glass containers measuring 28mm in diameter and 220mm in length, placing 20 cm³ samples of the various types of activated carbon particles into the individual containers, rotating the containers and their contents at the rate of 36 r.p.m. for a fixed length of time, sifting the contents through a metal screen of 200 mesh and measuring the weight of the portion of each sample passing through the screen. The results of a typical experiment performed as described above are shown in Table 1 below.

Table 1

| | Extent of attrition loss of particles due to friction in dry state (wt%) | | | |
|---|---|---|---|---|
| | Length of friction test (in hours) | | | |
| Type of activated carbon | 10 | 20 | 30 | 40 |
| Activated carbon spheres disclosed in U.S. Pat. No. 3,917,806 | 0 | 0 | 0.05 | 0.05 |
| Activated carbon spheres from caking coal | 0.05 | 0.08 | 0.22 | 0.60 |
| Coconut-shell activated carbon | 2.3 | 2.9 | 3.3 | 3.5 |

For the purposes of the present invention, the activated carbon spheres are preferred to have a bulk density in the range of from 0.4 to 0.7 g/cm³, a particle diameter distribution range of from 0.2 to 2.0mm and an average particle diameter in the range of from 0.4 to 1.2mm. If the particle diameter distribution of these activated carbon spheres is excessively sharp, then during the actual use of the activated carbon spheres, the phenomenon known as channeling is induced. If the particle diameter distribution of the activated carbon spheres is excessively broad, then the actual use of such activated carbon spheres does not encounter the disadvantage described above but results in an adverse situation wherein the spheres of larger diameters and those of smaller diameters become suspended at different positions in the bed. This leads to a condition wherein only spheres of smaller diameter flow over the weirs of the trays and descend down the interior of the tower.

Such a partial movement of the spheres is contrary to the requirement that the spheres should be transferred stably at a constant mass transfer rate. For this reason, the activated carbon spheres are preferred to have a particle diameter distribution such that the standard deviation of individual particle diameter distribution will fall in the range of from 0.05 to 0.20 mm.

Figure 2:
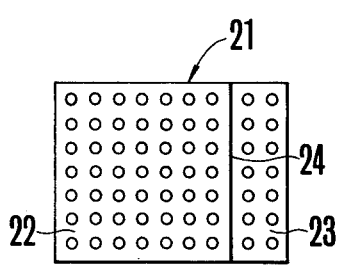
FIG. 2 is a plan view illustrating one preferred embodiment of one of the perforated plates used in the present invention.
Figure 3:
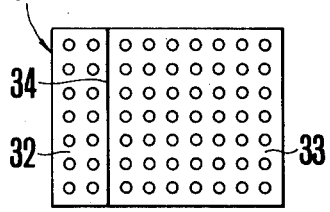
FIG. 3 is a plan view illustrating a perforated plate identical to the plate shown in FIG. 2, but in mirror-image position with respect to that of FIG. 2 to illustrate the symmetry between adjacent trays in the column of the present invention designed to provide cross-flow.
Figure 4:
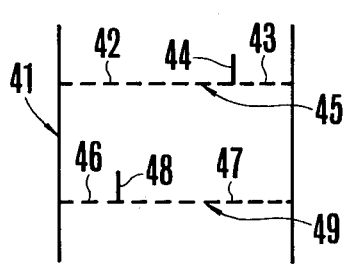
FIG. 4 is a schematic diagram illustrating a multiplicity of trays alternately arranged as in FIG. 2 and FIG 3.
Figure 5:
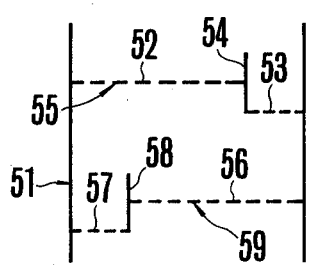
FIG. 5 is a schematic diagram illustrating a plurality of perforated plates as illustrated in FIG. 2 and FIG. 3 wherein the sections of a given tray are offset or stepped with respect to each other.
Figure 8:
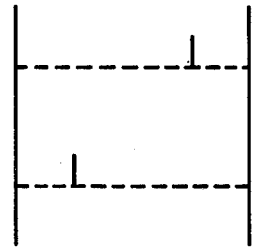
FIG. 8 is a schematic diagram illustrating a multiplicity of trays alternately arranged as in FIG. 6 and FIG. 7.
Figure 9:
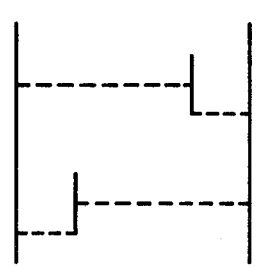
FIG. 9 is a schematic diagram illustrating a multiplicity of stepped trays having the same plan configuration as the trays of FIG. 6 and FIG. 7 alternately disposed inside a tower.

The present invention may use as shelves or trays, rectangular perforated plates of a type having a weir on the upper surface. As illustrated in FIG. 2 of the accompanying drawing, the surface of the tray is divided by the weir into a portion accounting for 80 to 95% of the total surface area and another portion accounting for 5 to 20% of the total surface area. In FIG. 2, 21 denotes one such rectangular perforated plate. The upper surface of this rectangular perforated plate 21 is divided by a weir 24 into a first zone or portion 22 and a second zone or portion 23. In FIG. 3, 31 denotes a rectangular perforated plate identical to the plate shown in FIG. 2 but arranged with the weir 34 at the left end to divide the tray into a first zone or portion 32 and a second zone or portion 33. The zone 22 of the plate of FIG. 2 and the zone 33 of the plate of FIG. 3 are the tray portions above which fluidized beds of activated carbon spheres are formed. The zone 23 of the plate of FIG. 2 and the zone 32 of the plate of FIG. 3 are the portions through which the activated carbon spheres descend to the next lower tray. Weirs 24 and 34 are disposed on their respective rectangular perforated plates so that zone 22 equals zone 33 and zone 23 equals zone 32 in surface area. The rectangular perforated plates 21 and 31 shown respectively in FIG. 2 and FIG. 3 are level along their entire surfaces and they each have a multiplicity of perforations formed at an aperture ratio in the range of from 5 to 25%. By "aperture ratio" is meant the percentage of the total tray surface area constituted by the total area of the aperture openings. The entire surfaces of the rectangular perforated plates 21 and 31 may be in one level plane as shown in FIGS. 4 and 8. Alternatively, the two zones of these plates may be in different horizontal planes separated by a vertical distance of 10 to 20 mm as shown in FIGS. 5 and 9. When the plates are level across their entire surface, the perforations drilled in the zones 22 and 33 will typically have a diameter in the range of from 3 to 5 mm and those bored in the zones 23 and 32 will preferably each have a diameter about 1.1 to 3 times the diameter of the perforations in the zones 22 and 33. When the plates have stepped horizontal surfaces, all the perforations bored therein may have the same diameter, for example in the approximate range of from 3 1 to 5 mm. The heights of the weirs 24 and 34 are not particularly critical, but are preferably in the range of from 20 to 60 mm. Weirs of substantially equal heights are provided on the respective trays to stabilize the fluidized beds of the activated carbon spheres and also to stabilize the transport rate of the spheres. The superficial velocity of the gas in the tower is preferred from the practical point of view to fall in the range of 0.5 to 2.0 m/sec. in consideration of the fact that the inside diameter of the tower is generally from 500 to 2,000 mm.

In the present invention, the rectangular perforated plates 21 and 31 are alternately disposed inside a tower as shown in FIG. 4 and FIG. 5, thus forming an adsorption section into which the gas is introduced for purification. In FIG. 4, 41 denotes a tower inside of which rectangular perforated plates 45 with surfaces each divided by a weir 44 into a relatively wide portion 42 and a relatively narrow portion 43, and rectangular perforated plates 49 with surfaces each divided by a weir 48 into a relatively narrow portion 46 and a relatively wide portion 47, are alternatively disposed. In FIG. 5, 51 denotes a tower inside of which rectangular perforated plates 55 have surfaces each divided by a weir 54 into a wide portion 52 and a narrow portion 53 alternately disposed with rectangular perforated plates 59 divided by weirs 58 into wide portions 56 and narrow portions 57. The narrow tray portions are located on a level (horizontal) plane 10 to 20 l mm below the wider portions. The vertical distance by which two adjacent trays are separated is typically equal to approximately the sum of the height of the weir plus 60 mm. To effect the purification of gas in the tower described above, the gas is fed upwardly into the tower from the bottom thus coming into counterflow contact with activated carbon spheres being introduced into the top of the tower, thereby forming fluidized beds on the trays. The activated carbon spheres thus formed into fluidized beds on tray portions 42 and 47 are horizontally transferred in the direction of zones 43 and 46 respectively, and then descend by gravity through the perforations in the zones 43 and 46 of the rectangular perforated plates 45 and 49 in the tower of FIG. 4 (or the zones 53 and 57 of the rectangular perforated plates 55 and 59 in the tower of FIG. 5) as they adsorb the gaseous pollutants of the gas under treatment.

After they have passed through the adsorption section the cargbon spheres are regenerated in the desorption and regeneration section. The regenerated activated carbon spheres are recycled, again being introduced into the top of the tower. The activated carbon spheres forming the fluidized beds move horizontally across the respective trays before descending to the next lower tray. To be more specific, the activated carbon spheres fall through the narrower portion (hereinafter referred to as "zone II") of a given tray onto the wider portion (hereinafter referred to as "zone I") of the next lower tray and move horizontally across the tray toward zone II at the same time forming a fluidized bed. The activated carbon spheres fed onto zone 42 of the rectangular perforated plate 45 in the tower of FIG. 4, for example, are horizontally transferred in the direction of the zone 43 by the upward stream of the gas and gravitational force and then descend through the perforations distributed in zone 43. The perforated plates used in the present invention which are rectangular in shape enjoy the advantages enumerated as (1) through (4) below. 1. The perforated plates are of simple construction and therefor can be easily produced. For this reason, the plates are useful for large gas-treating apparatus.

2. All the particles of activated carbon spheres move horizontally on the respective trays without disturbing the stabilized condition of the fluidized bed on each tray.

3. The direction in which the horizontal transfer of individual activated carbon spheres occurs on the trays alternates from tray to tray while the heights of the fluidized beds on the respective superposed trays are equal due to the weirs being of equal height. These facts make it possible to achieve steady-state mass transfer and to obtain uniform contact with the gas under treatment.

4. Each of the trays is divided into a portion for permitting downward flow of activated carbon spheres (zone II) and a portion for forming a fluidized bed of the spheres (zone I) and the area ratio of these two portions is constant. Therefore, by fixing the total aperture area in the zone I at a value falling in the range of from 4 to 20 times the total aperture area in the zone II, the weight of the spheres transferred can be stabilized with minimal deviation.

Figure 6:
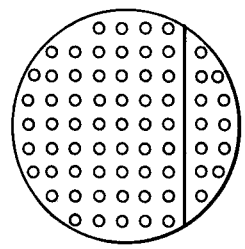
FIG. 6 is a plan view illustrating another embodiment of a perforated plate used in the present invention.
Figure 7:
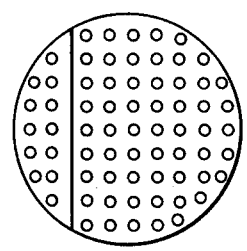
FIG. 7 is a plan view illustrating a perforated plate identical to that shown in FIG. 6, but in mirror-image position with respect to that of FIG. 6 to illustrate the relative arrangement of adjacent trays.

The perforated plates to be used in the present invention are not required to be rectangular in shape, insofar as they satisfy the advantages of (1) through (4) described above. They may be of a circular shape as shown in FIG. 6 and FIG. 7, for example.

Where a tower having an inside diameter exceeding 1,500 mm is used for some special reason, a slight inclination of the trays, of not more than 2°, may aid in the horizontal movement of activated carbon spheres across the trays. If the inside diameter of the tower is smaller, however, such an inclination may conversely result in an increased variation in the volume of activated carbon spheres transferred. The desirability of such an inclination, therefore, should be evaluated with respect to the inside diameter of the tower.

Due to the fact that activated carbon spheres are used as the absorbent particles and perforated plates of a specific design as described above, the present invention enables the fluidized bed formed on the superposed trays to be stabilized to a height equalling the height of the weirs disposed on the trays and, furthermore, permits the variation in the weight of activated carbon spheres being transferred to be limited within ±10% by weight without resorting to any auxiliary device. Thus, the invention enables the purification of the waste gas to be carried out continuously for a long period of time, for example, more than 200 hours with the efficiency of removal of the gaseous pollutants kept at a high level (far exceeding 80%). The gas which has been purified can be released into the atmosphere without further treatment from the top of the tower. The present invention also serves the purpose of simplifying the system itself, because it obviates the necessity of providing the trays with downcomers as in conventional techniques.

Now, the present invention will be described more specifically below with reference to preferred embodiments. It should be noted that the present invention is not limited in any way to these examples.

EXAMPLE 1

Rectangular perforated plates were each fabricated by joining a rectangular perforated plate measuring 20cm × 10cm and containing perforations 5mm in diameter in an aperture ratio of 17.9% and a rectangular perforated plate measuring 20cm × 90cm and containing perforations 4mm in diameter in an aperture ratio of 17.9% along their respective 20cm sides and placing a weir in the form of a flat plate 20mm in height along the joint so that the respective zones had an aperture area ratio of 1 : 9. The zones containing the perforations 5mm in diameter formed zones II for permitting downward flow of activated carbon spheres. A box-type fluidized bed test apparatus was made by disposing four of such trays in such a way that the horizontal direction of the movement of activated carbon spheres would alternate as they descended from tray to tray. Activated carbon spheres were fed downwardly onto the uppermost tray at a rate of 40 kg/hour and dry air was introduced upwardly below the lowermost tray at a superficial tower velocity of 1 m/sec. to fluidize the spheres. The activated carbon spheres were of the type having an average particle diameter of 0.7mm and a particle diameter distribution range of 0.2mm to 2.0mm. During a total of 2 hours of continued operation, the weight of activated carbon spheres which flowed out of the tower in two minutes (corresponding to average retention time of activated carbon spheres per tray in the apparatus of the present invention) was measured at a total of ten randomly selected points in time. The ten values thus obtained averaged 1.33 kg and the difference between the largest and smallest of the ten values was 0.12 kg.

For the purpose of comparison, rectangular perforated plates were fabricated each by joining a square plate measuring 20cm × 20cm and containing performations 5mm in diameter at an aperture ratio of 24% and a rectangular plate measuring 20cm × 80cm and containing performations 4mm in diameter at an aperture ratio of 17.9% along their respective 20cm sides and placing a weir in the form of a flat plate 20mm in height along the joint so that the respective zones had an aperture area ratio of 1 : 3. The square zones II permitted downward flow of activated carbon spheres. A fluidized bed test apparatus was made by disposing four of such trays in the same way as above. By using this apparatus, the experiment described above was repeated under the same conditions. The average of the values per tray was 1.28 kg and the difference between the largest and smallest of the values was 0.31 kg. The operation was further continued, without alteration, and the weight of activated carbon spheres which flowed out of the tower over a period of 8 minutes (corresponding to average retention time of activated carbon spheres per tower in the apparatus of this case) was measured three times at intervals of 20 minutes. The values were 5.8 kg, 5.4 kg and 6.7 kg, indicating that the rate of transport of the spheres was not stable.

To adapt the above test apparatus for the present invention, about half of the perforations contained in the zones II, permitting downward flow of spheres, in all the perforated plates were closed with adhesive tape. The same operation was repeated. The amount of activated carbon spheres which flowed out of the tower over a fixed period of two minutes was measured four times during a period of 30 minutes. In this case, the difference between the largest and smallest of the values per tray was 0.15 kg. In the continued operation, the amount of spheres which flowed out over a fixed period of eight minutes was measured three times at intervals of 30 minutes. The values per tower were 5.3 kg, 5.4 kg and 5.1 kg, indicating that the closure of half of the perforations served to stabilize the rate of transport of spheres.

By following the procedure described above, the flow amount of spheres for the average retention time (per tray) and the flow amount of spheres for the average retention time (per tower) were measured for various aperture area ratios. The results were as shown in Table 2 below.

Table 2

| Aperture area ratio between zone for downward flow and zone for Fluidized bed | Flow amount during retention time per tray | | Flow amount during retention time per tower | |
|---|---|---|---|---|
| | Average | Difference | Average | Difference |
| 1/3 | 1.28 kg | 0.31 | 6.0 kg | 1.3 |
| 1/4 | 1.24 kg | 0.27 | 5.6 kg | 0.9 |
| 1/6 | — | — | 5.3 kg | 0.3 |
| 1/10 | 1.33 kg | 0.12 | — | — |
| 1/10 | 1.33 kg | 0.18 | 5.7 kg | 0.2 |
| 1/12 | 1.25 kg | 0.15 | 5.7 kg | 0.9 |

Table 2-continued

| Aperture area ratio between zone for downward flow and zone for Fluidized bed | Flow amount during retention time per tray | | Flow amount during retention time per tower | |
|---|---|---|---|---|
| | Average | Difference | Average | Difference |
| 1/12 | — | — | 5.4 kg | 0.3 |
| 1/18 | 1.31 kg | 0.20 | — | — |
| 1/20 | 1.28 kg | 0.15 | 5.3 kg | 0.3 |
| 1/24 | — | — | 5.0 kg | 1.2 |

From the above results, it was concluded that the rate of transport of activated carbon spheres could be stabilized to within 10% by weight where the aperture area of the zone I was in the range of from 4 to 20 times the aperture area of the zone II.

EXAMPLE 2

1. In the test apparatus of Example 1 which had an aperture area ratio of 9 : 1, the experiment was performed with the superficial-tower gas velocity varied to 0.6 m/sec, 0.8 m/sec 0.1 m/sec and 1.2 m/sec and the recirculation rate of spheres to three values of 20 kg/hr, 40 kg/hr and 50 kg/hr to determine changes in the pressure drop across the entire tower. It was found that under all these test parameters, the pressure drop remained constant at a value of 40 mm of water. Under all conditions, the variation in the water level in the manometer was very slight, on the order of about 5 mm.

2. To permit sampling of spheres from each of the trays of this test apparatus, each tray zone permitting downward flow of spheres was disposed at a level 20 mm lower than the level of other zone of the tray (Zone I) which supports the fluidized bed and was each provided with a sampling port. Colored spheres prepared by spraying activated carbon spheres with a white paint were fed for a moment into the tower. Then, samples from the various trays were examined to determine the time-course change of the density of colored spheres in the samples. In all the trays, the intervals from the time the colored spheres were introduced to the time the density of colored spheres in the samples reached its peak were invariably in the range of from 90 to 100 seconds. This means that the average speed of movement of spheres in the horizontal direction was equal for all trays and, therefore, the fluidized beds of spheres were so stable as to have equal average retention times.

It was further observed that the downward flow of spheres was extremely stable where the zones of the plates for downward flow of spheres (Zone II) were at levels stepped below those zones supporting the fluidized beds (Zone I).

EXAMPLE 3

Figure 10:
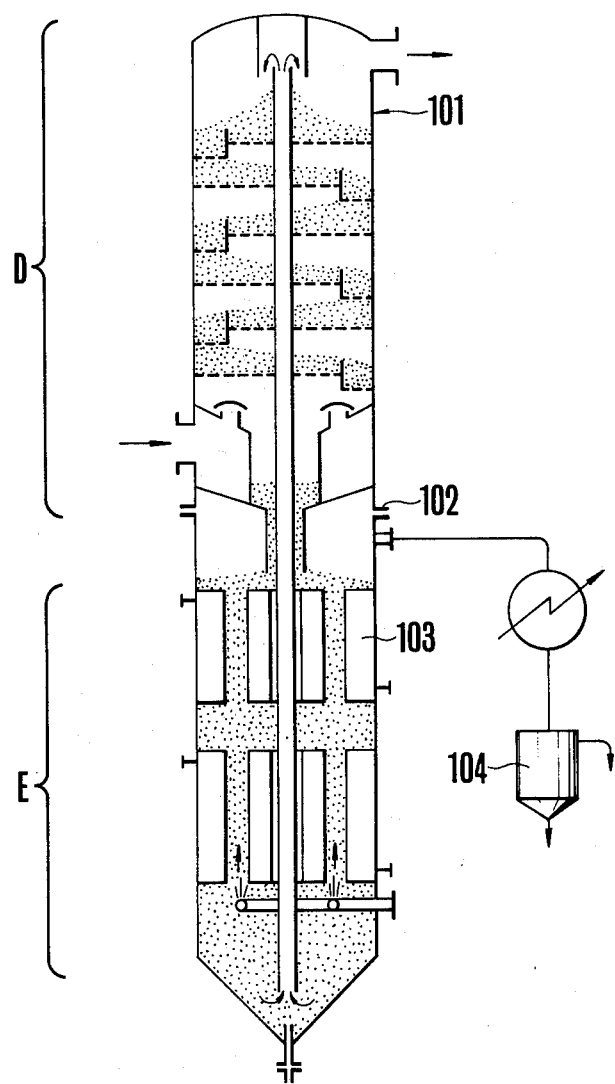
FIG. 10 is a schematic diagram illustrating one preferred embodiment of the present invention in which a gas containing gaseous pollutants is treated continuously for the removal of the gaseous pollutants.

Vinyl chloride monomer (VCM) was removed and recoverd from an exhaust gas in accordance with the method of the present invention by circulating activated carbon spheres measuring 0.8 mm in average diameter, through a gas-treating apparatus as shown in FIG. 10.

In FIG. 10, 101 denotes the gas-treating apparatus having a fluidized-bed adsorption section (D) consisting of the six stepped trays formed by alternatively disposing the rectangular perforated plates as shown in FIG. 2 and FIG. 3. Zone II of each tray is on a level lower than the zone I as shown in FIG. 5.

The aperture area ratio of the zone I to the zone II is 9 : 1. Each of the rectangular perforated plates, which are made of stainless steel, measures 450 mm × 450 mm and contains perforations 3.5 mm in diameter in an aperture ratio of 17.5%. The weir on each of the rectangular perforated plates is 40 mm in height. The vertical distance between zone I and zone II of a given tray is 15 mm. The desorbing section (E) in the apparatus 101 is connected with the adsorption section (D) at flange 102 and is of the so-called shell-and-tube type structure consisting of a preheating zone and a desorbing zone. The desorbing section (E) is in the form of a circular tower having an inner diameter of 690 mm and a height of about 3,000 mm. The adsorption section (D) is in the form of rectangular tower having a height of 2,000 mm. Further, in FIG. 10, 103 indicates a preheating jacket and 104 a decanter.

The operation conditions and the results in this Example were as shown in Table 3 below.

EXAMPLE 4

VCM was removed and recovered from the exhaust gas by the same procedure as in Example 3, with the same apparatus as used in Example 3 except that the circular perforated plates as shown in FIG. 6 and FIG. 7 were used in place of the rectangular perforated plates.

Each of the circular perforated plates made from a carbon-steel measured 500 mm in diameter and contained perforations 3.5 mm in diameter in an aperture ratio of 17.5%. The aperture ratio of the zone I to the zone II was 9 : 1. The weir on each of the circular perforated plates was 40 mm in height. The zone II of each tray was on a level lower than zone I as shown in FIG. 9. The vertical distance between zone I and zone II of each tray was 15 mm. The adsorption section (D) was in the form of a circular tower having a height of 2,000 mm.

The operation conditions and the results in this Example were as shown in Table 3 below.

The results shown in Table 3 indicate that the circular perforated plates (Example 4) are only slightly inferior to rectangular perforated plates (Example 3) in performance.

The teachings of applicants' earlier filed copending application U.S. Ser. No. 659,901, filed Feb. 20, 1976 are hereby incorporated herein by reference.

Table 3

| | | Example 3 | Example 4 |
|---|---|---|---|
| | Shape of tray | Rectangular | Circular |
| | Flow amount of exhaust gas to be treated (Nm³/hour) | 560 | 555 |
| Operation conditions | Temperature of exhaust gas to be treated (° C) | 23 | 23 |
| | Circulation amount of activated carbon spheres (kg/hour) | 120 | 120 |
| | Pressure of steam for heating the desorbing section (E) (kg/cm²-Gage) | 5.2 | 5.2 |
| | Feed amount of stripping steam for the desorbing section (E) (kg/hour) | 24 | 25 |

Concentration of VCM (ppm volume/volume)

Table 3-continued

|  |  | Example 3 | Example 4 |
|---|---|---|---|
| Result | Inlet | 4,947 | 5,047 |
|  | On the first tray | 1,546 | 2,009 |
|  | On the second tray | 218 | 375 |
|  | On the third tray | 41 | 104 |
|  | On the fourth tray | 12 | 12 |
|  | On the fifth tray | 6 | 7 |
|  | On the sixth tray | 4 | 6 |
|  | Outlet | 5 | 7 |

We claim:

1. A method for the continuous purification of a waste gas containing gaseous pollutants comprising:
    providing a tower containing a plurality of vertically spaced, perforated trays, each tray having a single weir, extending horizontally along a substantially straight line, provided on its upper surface disposed to divide its surface area into a first section having a plurality of apertures and constituting 80-95% of the total surface area of the tray and a second section having a plurality of apertures and constituting 5-20% of the total surface area of the tray, the location of the weirs on the various trays alternating from side to side in the tower;
    continuously introducing said waste gas upwardly into a lower section of said tower and at the same time continuously introducing activated carbon spheres into an upper section of the tower for contact with said waste gas thereby forming a fluidizedbed on said first section of each of said trays; and
    continuously removing purified gas from the top of said tower.

2. The method of claim 1 wherein the aperture area of said first section is 4 to 20 times that of the aperture area of said second section.

3. The method of claim 1 wherein the aperture area of each tray constitutes 5 to 25% of the total tray area.

4. The method of claim 1 wherein said waste gas is introduced into said tower at a superficial velocity in the range of 0.5 to 2.0 meters/second.

5. The method of claim 1 wherein said activated carbon spheres have a particle diameter distribution range of from 0.2 to 2.0 mm, an average particle diameter in the range of from 0.5 to 1.2 mm and a bulk density of from 0.4 to 0.7 g/cm$^2$.

6. The method of claim 1 wherein said activated carbon spheres are produced by fusing pitch, molding the fused pitch into spheres and subjecting the resultant pitch spheres to the treatments of infusibilization, carbonization, and activation.

7. The method of claim 1 further comprising:
    heating the carbon spheres exiting the lowermost tray to regenerate said carbon spheres and recycling the regenerated spheres to the uppermost tray.

8. A chemical process column containing a plurality of vertically-spaced perforated trays, each of said trays have a single weir, extending horizontally along a substantially straight line, provided on its upper surface to divide its upper surface into first and second sections, each of said tray sections having a plurality of perforations, and said first tray section having a surface area constituting 80 to 95% of the total tray surface area.

9. The column of claim 8 wherein said aperture area of said first section is 4 to 20 times the aperture area of said second section.

10. The column of claim 8 wherein the aperture area of each tray constitutes 5 to 25% of the total tray area.

11. The apparatus of claim 8 wherein the height of said weir is in the range of from 20 to 60 mm.

12. The column of claim 8 wherein each of said trays is rectangular in shape.

13. The column of claim 8 wherein said first and second tray sections of each tray are level.

14. The column of claim 8 wherein said second section of each tray is on a level lower than the level of the first section of the same tray.

15. The column of claim 13 wherein the apertures in said second section have a diameter about 1.1 to 3 times the diameter of the apertures in said first section.

* * * * *